(12) United States Patent
Immler

(10) Patent No.: US 8,714,228 B2
(45) Date of Patent: May 6, 2014

(54) MOUNTING DEVICE, AND METHOD FOR MOUNTING AND DISMOUNTING A VEHICLE TIRE ON A WHEEL RIM

(75) Inventor: Michael Immler, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/491,068

(22) Filed: Jun. 7, 2012

(65) Prior Publication Data

US 2012/0241099 A1    Sep. 27, 2012

Related U.S. Application Data

(63) Continuation of application No. 12/448,697, filed as application No. PCT/EP2007/011337 on Dec. 21, 2007, now Pat. No. 8,215,366.

(30) Foreign Application Priority Data

Jan. 4, 2007    (DE) .......................... 10 2007 001 628

(51) Int. Cl.
    *B60C 25/125*    (2006.01)
(52) U.S. Cl.
    USPC .............................. 157/1.17; 157/1.21; 157/11
(58) Field of Classification Search
    USPC .......... 157/1.17, 1.1, 1.21, 1.2, 1.24, 1.28, 11
    See application file for complete search history.

(56) References Cited

U.S. PATENT DOCUMENTS

| | | | |
|---|---|---|---|
| 2,704,570 | A | 3/1955 | Reeves |
| 2,873,777 | A | 2/1959 | Thostenson |
| 3,578,059 | A | 5/1971 | Uhen |
| 4,093,015 | A | 6/1978 | Malinski |
| 4,314,597 | A | 2/1982 | Zrostlik |
| 4,462,451 | A | 7/1984 | Ogren |
| 4,800,944 | A | 1/1989 | Kane |
| 4,969,499 | A | 11/1990 | Ashman |
| 5,339,880 | A | 8/1994 | Kawabe et al. |
| 6,192,959 | B1 | 2/2001 | Spaggiari |
| 7,699,087 | B2 | 4/2010 | Rogalla |
| 7,726,376 | B2 | 6/2010 | Gonzaga |

FOREIGN PATENT DOCUMENTS

| | | |
|---|---|---|
| CN | 1701976 | 11/2005 |
| DE | 102007062980 | 7/2008 |
| EP | 0 947 360 | 10/1999 |
| EP | 1 167 089 | 1/2002 |
| EP | 1 625 954 | 2/2006 |
| EP | 1 738 937 | 1/2007 |
| JP | 2005-081921 | 3/2005 |
| WO | WO 02/055325 | 7/2002 |
| WO | 2008/080584 | 7/2008 |

OTHER PUBLICATIONS

International Search Report dated May 15, 2008.

*Primary Examiner* — Hadi Shakeri
(74) *Attorney, Agent, or Firm* — Jacobson Holman PLLC

(57) ABSTRACT

A mounting device for mounting or dismounting a vehicle tire on a wheel rim, the wheel rim or the wheel being supported on a mounting table and a pressing-down device being provided for sliding the vehicle tire on the wheel rim. A movement of the pressing-down device is essentially parallel to the wheel axis for sliding the vehicle tire on the wheel rim or pulling off the vehicle tire from the wheel rim.

4 Claims, 6 Drawing Sheets

MOUNTING DEVICE, AND METHOD FOR MOUNTING AND DISMOUNTING A VEHICLE TIRE ON A WHEEL RIM

This application is a Continuation Application of U.S. patent application Ser. No. 12/448,697, filed Jul. 1, 2009 now U.S. Pat. No. 8,215,366, which is a national stage of PCT/EP07/011,337 filed Dec. 21, 2007 and published in German, which has a priority of German patent application no. 10 2007 001 628.1 filed Jan. 4, 2007, which is incorporated by reference herein.

FIELD OF THE INVENTION

The invention refers to a mounting device for mounting or dismounting a vehicle tire on a wheel rim, the wheel rim being supported on a mounting table and a pressing-down device being provided for sliding the vehicle tire on the wheel rim. The invention furthermore refers to a mounting system as well as a method for mounting or dismounting a vehicle tire.

BACKGROUND OF THE INVENTION

The known mounting methods mount a tire in such a way on a wheel rim that the bead is pressed with a rotating movement of the wheel rim under the wheel flange of the wheel rim. A pressing down device is then stationary during mounting and squeezes in the circumference direction the bead of the wheel rim which is still outside the wheel rim in the direction of the circumference by the rotating movement over the wheel flange in the wheel rim.

As, of course, the diameter of the bead of the vehicle tire is less than the diameter of the wheel rim at the end often with large power and sharp tools it is tried to lift the tire bead over the wheel flange.

This often leads to damages of the tire and/or the wheel rim which may not be visible during mounting but may, for example, damage the tire in use permanently.

When loaded high, for example with high speed, these tires loose air or come off the wheel rim. The cause of all that are these damages during mounting.

SUMMARY OF THE INVENTION

It is an object of the invention to improve the state of the art in such a way that the tire does not get damaged during mounting.

In order to solve this problem the invention refers to a mounting device as described in the beginning and suggests that a movement of the pressing-down device which is essentially parallel to the tire axis is provided for sliding the vehicle tire on the wheel rim or pulling off the vehicle tire from the wheel rim.

In contrast to the marketed mounting machines where in most of the cases the tire is mounted by rotating the assembly disc and mounting the bead by a mounting head in the mounting device according to the invention the tire is not moved in one rotating direction.

This is achieved by the fact that a part of the bead is already put in the wheel rim over the wheel flange when the tire is mounted, and is located there in an area with smaller diameter, in the so-called drop-base of the wheel rim. This area with smaller diameter makes it possible to move the bead as far in radial direction outward in this area opposite the area of the wheel rim that it can be pushed with little power over the wheel flange in the wheel rim. The movement of the pressing-down device necessary here is parallel to the wheel axis or acute to it. Also a certain acute angle counts in this respect as still essentially parallel to the movement to the tire axis according to the invention. It is decisive that between the pressing-down device and the wheel rim there is no relative rotating movement leading to the damages of the tire as the pressing-down device damages exactly the tire in the bead area during that.

In this connection the rotational axis of the complete wheel is the tire axis. According to the invention the mounting device refers to a vehicle tire, the term vehicle can be also interpreted very extended, as also the landing gear of an aircraft serves as vehicle in this respect.

In a preferred embodiment of the mounting device according to the invention it is provided that the mounting device has a stanchion orientated essentially parallel to the tire axis which is arranged next to the wheel supported on the mounting table and carries the stanchion of the pressing-down device.

Alternatively to that it is provided that the mounting device has a holding arbor for holding the wheel rim, and on the holding arbor a stanchion for the pressing-down device can be fastened.

In the first-mentioned modification the pressing-down device is at a stanchion fixedly arranged at the mounting device. This stanchion is located next to the wheel supported on the mounting table. In the other modification the stanchion is constructed as element which can be additionally mounted at the mounting device.

As the pressing-down device carries out during the mounting or dismounting process an active movement essentially parallel to the tire axis, of course, the arrangement of the stanchion has to be sufficiently stable in mechanic respect. Therefore, for example, the holding arbor has a suitable thread on which the stanchion then can be screwed with a corresponding thread and has a stable seat.

The holding arbor penetrates the wheel rim in the center in order to align the wheel rim or the wheel on the mounting table and then to fix it by a suitable fastening means, for example a nut or the like.

With reference to the wheel rim or entire wheel clamped on the mounting table for mounting and dismounting purposes, respectively, the stanchion extends in a direction essentially parallel to the wheel axis. The pressing-down device is positioned at a lug arranged at the stanchion.

For adjusting purposes the lug is supported on bearings rotating at the stanchion. Also the position of the pressing-down device on the lug or the effective length of the lug can vary so that the pressing-down device can be adjusted in the respectively correct position at the vehicle tire. In particular the lug can be adjusted to the respective diameter of the vehicle tire.

In a preferred modification of the invention an electrically, hydraulically or pneumatically acting drive of the pressing-down device is provided. By means of this drive the pressing-down device has a movement in a direction which is essentially parallel to the tire axis in order to push the bead of the tire over the wheel flange. Cleverly, this drive is activated by a feet-switch.

It is, of course, also possible to operate the pressing-down device manually, mechanically, for example by means of a suitable linkage with lever pairs or a gear.

The invention comprises furthermore also a mounting system consisting of a mounting device as described in the beginning and comprising a mounting table as well as a pushing device. The pushing device shifts the vehicle tire which has to mounted on a wheel rim with respect to the wheel rim radial in such a way that a part of the bead located on the wheel rim gets in the drop base of the wheel rim. This radial movement does not do any harm to the vehicle tire that means it does not get any damages. By the radial shifting the bead area which is not yet on the wheel rim in radial direction so far over or to the wheel flange that the bead by means of the movement of the pressing-down device is slid over the wheel flange in a way which is also gentle for the tire. Here the direction of movement of the pressing-down device is rectangular to the wheel rim and thus parallel the wheel axis. It is clear that the invention works also with an angle acute to it.

According to the invention for the mounting system a radial movement or shifting movement of the vehicle tire relatively to the wheel rim is suggested, this being carried out, of course, either by a pushing movement of the vehicle tire to the wheel rim or vice versa of the fixed vehicle tire to the moved wheel rim. The pushing movement must have a radial amount at least with respect to the circular wheel rim that means the pushing direction can be again orientated inclined to the plane of the wheel rim, in order to act according to the invention.

In a preferred embodiment of the mounting system it is provided that a pushing force is impressed in the vehicle tire by the pushing device in a tire position of the vehicle tire, and thus the bead of the vehicle tire is pressed in the drop base of the wheel rim, and in a position spaced from the tire position at the vehicle tire preferably diametrical to the tire position the pressing down device presses the bead by a movement essentially parallel to the wheel axis over the wheel flange to the wheel rim.

The pushing device suggested with the mounting system according to the invention is realised, in a first modification of the invention, as a stamp, for example as radial or with a radial movement component, moving for example pneumatically or hydraulically which acts on the cover of the vehicle tire. The stamp has here a circle segment-like front side adjusted to the cover of the tire to bring the pushing force planar to the vehicle tire and thus to press on a larger area of the bead already on the wheel rim in the drop base of the wheel rim.

Another modification according to the invention provides that the pushing device is formed by a belt which can in particular be tensioned by a tensioning device, the belt being in contact with the cover of the tire at least partly during mounting along the cover of the vehicle tire and being tensioned. The belt is in this modification according to the invention at least partly in contact with the cover of the tire in the direction of the circumference of the cover of tire, and effects then by the tensioning device a power component radial at least with respect to the wheel rim which has the effect that the bead is pressed or pushed in the drop base of the wheel rim.

It has to be taken into consideration here that by means of the belt in a very homogenous way a pushing force can be brought in the vehicle tire. Here the belt is in contact in a large area of the circumference angle with the cover of the tire and the yielding tire cannot yield in the area where the belt is in contact with it. The complete shifting of the vehicle tire is focused in the area where the belt is not in contact with the cover of the tire, perhaps because there also the tensioning device is provided. Therefore the result is a very effective pushing device. By exchanging the belt the arrangement can also be adjusted to different width of tires.

In a preferred modification of the invention the mounting system also comprises a pressing-down device by means of which the bead is held in the drop base during mounting. The invention here claims not only protection for the pressing-down device in combination with mounting system according to the invention, but also for the pressing-down device solely. Here it is cleverly also suggested that at least the area of the pressing-down device interacting with the vehicle tire consists of synthetic or rubber material.

It is provided here that the entire pressing-down device consists of, for example, synthetic or rubber material or only the area of the pressing-down device interacting with the tire.

In another modification the pressing-down device carries a suitable cover of synthetic or rubber material and is otherwise manufactured from metal in order to be sufficiently stable.

Cleverly the pressing-down device is designed as hand tool which is held and employed during mounting the vehicle tire by the mechanic. However, it is also possible that the pressing-down device is provided as part of the mounting system, for example at the mounting system or the mounting device at a suitable moving bracket or lug and thus can be adjusted in a suitable way to the vehicle tire or the wheel rim in order to keep the bead in the drop base. The pressing-down device is designed here wedge-like to push with its wedge-like end the bead in the drop base.

Furthermore it is possible that the pressing-down device is driven electrically, pneumatically or hydraulically or is carried by a stand sufficiently stable to receive the reaction power.

It is also convenient that the pressing-down device corresponds essentially or to a large extent in the front region with the radius of the wheel flange or the drop base.

By means of that it is achieved that the pressing-down device interacts gently over a larger area with the bead and is also able to press the bead along a larger arc segment into the drop base. Cleverly here the front area is designed with a radius adjusted to the wheel flange or the drop base, that means the radii occurring in this area and thus supports mounting ideally.

The method for mounting a vehicle tire on a wheel rim suggested according to the invention, where a vehicle tire is at least partly on a wheel rim, a bead being located at least partly over the wheel flange, is characterised in that the vehicle tire is shifted by a pushing device relatively in such a way radial to the wheel rim that a part of the bead is pressed into the drop base of the wheel rim, and, after that, the area of the bead still in front of the wheel flange is pressed by an essentially rectangular movement, with respect to the wheel rim, over the wheel flange in the wheel rim.

In a preferred embodiment of the method here as pushing device a belt is arranged and tensioned along the cover of the vehicle tire, at least along a part of the cover of the tire.

It has to be taken into consideration here that according to the method of the invention the top or bottom bead is not decisive. The method according to the invention can be employed for both beads. Therefore, for mounting a vehicle tire the method, if necessary, is carried out twice one time after the other, namely first of all for the bottom and then for the top bead.

It has been recognised here that by the purposeful pressing of the bead in the drop base the vehicle tire is shifted radial so far that the bead has only to be pressed over the wheel flange at the point opposite or remote from the tire position only with slight effort, without damaging the tire.

Here the invention makes sure, if necessary by using the pressing-down device, that the bead laying on the wheel rim remains even during mounting in the drop base and does not slide out again which may occur because of the geometry. It has namely to be taken into consideration that, with respect to the plane of the wheel rim, the vehicle tire to be mounted has to be slid on the wheel rim tilted so that a part of the bead will be supported on the wheel rim, however, the other area has still to be drawn over the wheel flange. This means, of course, also that not the entire bead area in contact with the wheel rim can be in the drop base, but can slide out partly. This sliding out is prevented, if necessary, by the use of the pressing-down device. It has to be taken into consideration here that the use of the pressing-down device according to the invention is provided optionally and not compulsorily. Also the design of the drop base, which is a groove in the base of the rim, supports in a suitable way keeping the bead in the drop base.

It has to be taken into consideration here that, after the bead of the tire has been drawn completely over the wheel flange, the diameter of the circular tire bead is larger than the diameter of the drop base or the base of the rim, and therefore the bead gets out of the drop base without any problems and snuggles up to the interior of the wheel flange.

Mounting the tire on the wheel rim is done by means of a belt and a pressing-down device which presses the tire over the wheel flange to the wheel rim. By this new way of mounting the tire in particular to one-piece drop base rims the typical mounting markings and damages are avoided.

It has to be taken into consideration here that the invention cannot only be used in so-called drop base rims but, of course, also can be used with all other wheel rims the rim bases of which have a sufficiently small diameter without having actually a groove-like drop base.

Pressing the deaerated tire away from the wheel rim is carried with marketed systems, however, is also possible with the device according to the invention.

Dismounting is done by means of a lever which lifts the pre-tensioned bead over the wheel flange.

Clamping of the wheel rim on the mounting device or the mounting table can be done by means of marketed devices such as the mounting.

An example of a mounting device according to the invention comprises essentially the following components.

1. Mounting table with clamping device for fixing the wheel rim:
   The wheel/the wheel rim is clamped on a mounting table by means of clamping claws or an activating device.
   This mounting table is constructed either horizontally or at an angle of up to about 30°.
   Clamping the wheel rim is carried out by clamping claws by:
   a. mechanic clamping by means of spindle or a fastening nut screwed on a positioning arbor
   b. pressure-limited, electrically driven spindle
   c. pressure-limited, pneumatic clamping by means of a piston 2. Movable belt, fixedly fastened in a slotted cylinder attached to the device for mounting the tire on the wheel rim and dismounting the tire from the wheel rim:
   The belt carrying out the mounting process of the tire is fixedly fastened to the mounting device. The belt can be attached in finite or endless design. During the mounting process the belt is tensioned to mount the tire on the wheel rim.
   This tensioning of the belt is carried out:
   a. By a fixed, slotted cylinder which is rotated by a ratchet. During this operation the belt is tensioned by rolling up.
   b. By a fixed, slotted cylinder which is rotated by an electro-motor. During this operation the belt is tensioned by rolling up.
   c. By a pneumatically or hydraulically selected piston which presses the belt away in the direction from the tire. This movement tensions the belt.
   d. Alternatively the belt is tensioned by removing the mounting table away from the fixing of the belt.

3. A pressing-down device for fixing the top bead during mounting.
   This pressing-down device made of synthetic material is designed almost according to the radius of the wheel flange and holds the top tire bead during mounting the belt in the drop base.

4. A mounting lever for pressing the top bead in the base of the rim during mounting
   This lever which is provided with a shaped pressing-down device presses the top bead gently and without damaging it in the base of the rim.
   During mounting the lever, where also a dismounting finger is arranged, is used. Here the bead is lifted over the wheel flange and dismounted by means of this lever.

5. A push-back device for pushing away both beads from the wheel flange over the hump in the drop base.
   Here the conventional push-back device by means of a way-limited push-back shovel or a roll-of device is used which pushes the bead from the wheel rim.

It is clear that the example described before is only one of many embodiments of the mounting device according to the invention or the mounting system according to the invention. It is, in particular, possible to do without one or the other element and nevertheless to be able to carry out the invention.

In the following the method according to the invention for mounting a vehicle tire on a wheel rim, preferably by means of the mounting system according to the invention is described exemplary and without limiting the range of protection to it.

1. Clamping the wheel/the wheel rim on the mounting table:
   The wheel/the wheel rim is put on the mounting table and fixed firmly by means of the clamping device, for example by clamping claws.
   Alternatively the wheel/the wheel rim is clamped centered over a screwing clamping device through the center whole of the wheel rim.
   It has to be taken into consideration here that the wheel flanges are not damaged.
   The essential advantage of the invention is the fact that the tire is not mounted under a rotating movement and thus a precise centering of the wheel is not necessarily required.

2. Mounting of the bottom bead over the top wheel flange:
   Tire beads are provided on both sides with a sufficient amount of mounting sliding agent!
   After clamping the wheel rim the bottom bead of the tire is slid over the part of the wheel flange of the rim opposite the holder of the belt.
   Then the belt is put in the area of the upper belted edge around the tire (in the direction of the circumference of the tire seen on a part of the cover of the tire), fixed and slightly pre-tensioned.
   After that the belt is firmly tensioned by the tensioning device. By this tensioning of the belt the bottom bead is pushed in the drop base.
   The bead moves over the upper wheel flange of the rim by exercising a light pressure with the pressing-down device on the top side wall. Pressing down can also be done manually.

3. Mounting the top tire bead over the upper wheel flange
   After finishing mounting the bottom bead the belt is released and a part of the top tire bead is pushed in the direction of the drop base below the upper wheel flange.
   Then the pressing-down device is pushed under the wheel flange and fixed.
   After fixing the top bead in this way in the area of the wheel base the belt is fixed in the area of the upper belted edge and slightly pre-tensioned.
   After checking the correct seat of the tire and the belt the belt is firmly tensioned with the tensioning device.

This tensioning of the belt pushes the top bead in an area of about ⅔ of its circumference in the drop base.

The use of the pressing-down device pushes the rest of the bead, which is still located above the wheel flange, over the wheel flange. For that the pressing-down device is moved rectangular to the wheel rim, that is in a direction essentially parallel to the wheel axis, so that the bead slides over the wheel flange. It may also be possible, if the dimensions of the vehicle tire or the wheel rim make it possible, to push the bead also by manual pressing in a direction parallel to the wheel axis over the wheel flange.

In contrast to the mounting discs which were rotating so far where the wheel rim rotates against a stationary mounting head, or with other systems where a mounting head rotates around a firmly clamped wheel rim, the vehicle tire is in the process according to the invention mounted gently without any rotating movement.

By fixing the bead in the drop base of the rim by means of tensioning the belt and pushing the bead relaxed in this area typical mounting damages as they occur in mounting with rotating mounting machines are prevented.

At the end, first of all the belt, then the clamping device is released and the complete wheel is removed from the mounting device.

In the same way as the mounting by means of the process according to the invention is carried out very gently for the vehicle tire, also dismounting by means of the process according to the invention which is described in the following is possible for the vehicle tire very gently. Here the same effect as it is employed for mounting is also used for dismounting the vehicle tire. For that first of all in a suitable way the vehicle tire is shifted radial to the wheel rim, so that it is achieved that at least a part of the bead is pressed in the tire position in the drop base of the rim. Another area of the bead, as a rule opposite the tire position, however at least very much removed from the tire position, is then pressed out of the rim by a movement essentially rectangular with respect to the wheel rim over the wheel flange. This procedure can be used here for the bottom as well as for the top bead. Radial shifting of the vehicle tire can be carried out, as described, for example with the clamping belt. However, also the pushing device may be employed for that. A relative movement in radial direction between wheel rim and vehicle tire is decisive which are arranged ideally concentric to each other. It is possible here that, similar to the mounting process, either the wheel rim is held and the vehicle tire is moved, or the vehicle tire is held and the wheel rim is moved in a suitable way relatively to the held vehicle tire. Both modifications are comprised by the invention.

In the following dismounting is described in detail exemplary, however without restricting the method according to the invention for dismounting the vehicle tire to it.

1. Deaerating and pushing off

The complete wheel is deaerated by removing the valve core. After the air has completely left the tire is pressed from the rim seat/bead seat in the drop base by means of push-off device.

2. Clamping the wheel/the wheel rim on the mounting table:

The complete wheel is put on the mounting table and the wheel rim firmly fixed by the clamping device via the clamping claws.

It has to be taken care here that the wheel flanges are not damaged.

It is the essential advantage of the invention that the wheel is not mounted while rotating and thus precise centering of the wheel is not necessarily required.

3. Lifting the top bead over the upper wheel flange

The clamping belt is put around the tire and in the area of the lower belted edge fixed and slightly pre-tensioned.

After that the top bead of the tire is pressed in the drop base with the hand or by means of the pressing-down device.

After the correct seat of the tire and belt has been checked the belt is tensioned firmly with the tensioning device.

By this tensioning of the belt the top bead is pushed in the drop base in an area of about ⅓ of its circumference.

By means of that a gap occurs opposite the point of pressure, which is caused by the belt, between the top tire bead and the wheel flange.

The tire is then pushed upward manually or, if necessary, also by means of the pressing device.

By means of the lever the top tire bead is moved over the upper wheel flange. The belt is loosened here.

4. Lifting the bottom bead over the upper wheel flange

The clamping belt is put around the tire and fixed in the area of the lower belted edge and slightly pre-tensioned.

After the correct seat of the tire and the belt has been checked the belt is tensioned firmly with the tensioning device.

This tensioning of the belt pushes the bottom bead in the drop base in an area of about ⅓ of its circumference. By means of this a gap occurs opposite the pressure point, which is caused by the belt, between the top tire bead and the wheel flange.

The tire is then manually or, if necessary, also by means of the pressing device pressed upwards.

By means of the lever the bottom tire bead is moved over the upper wheel flange. The belt is loosened here.

The dismounted tire is removed and the wheel rim is released from the clamping device and removed.

The invention furthermore refers to the use of a belt for mounting or dismounting a vehicle tire on a wheel rim. By means of the belt it is possible to shift the vehicle tire relatively to the rim radial in such a way that in a simple manner mounting or dismounting of the vehicle tire on or from the rim is possible.

In this connection it is in particular pointed out that all characteristics and features, but also all methods, described with respect to the mounting device or the mounting system can accordingly be transferred with respect to the formulating of the mounting or dismounting method according to the invention and can also be employed according to the invention and are seen as also disclosed. The same goes also vice versa. This means only constructive, that is device characteristics mentioned with respect to the mounting method or dismounting method, may also be considered in the frame of the device claims or the claims referring to the system and be claimed and also count as part of the invention and disclosure.

DETAILED DESCRIPTION OF THE PREFERRED EMBODIMENTS

Figure 1A:
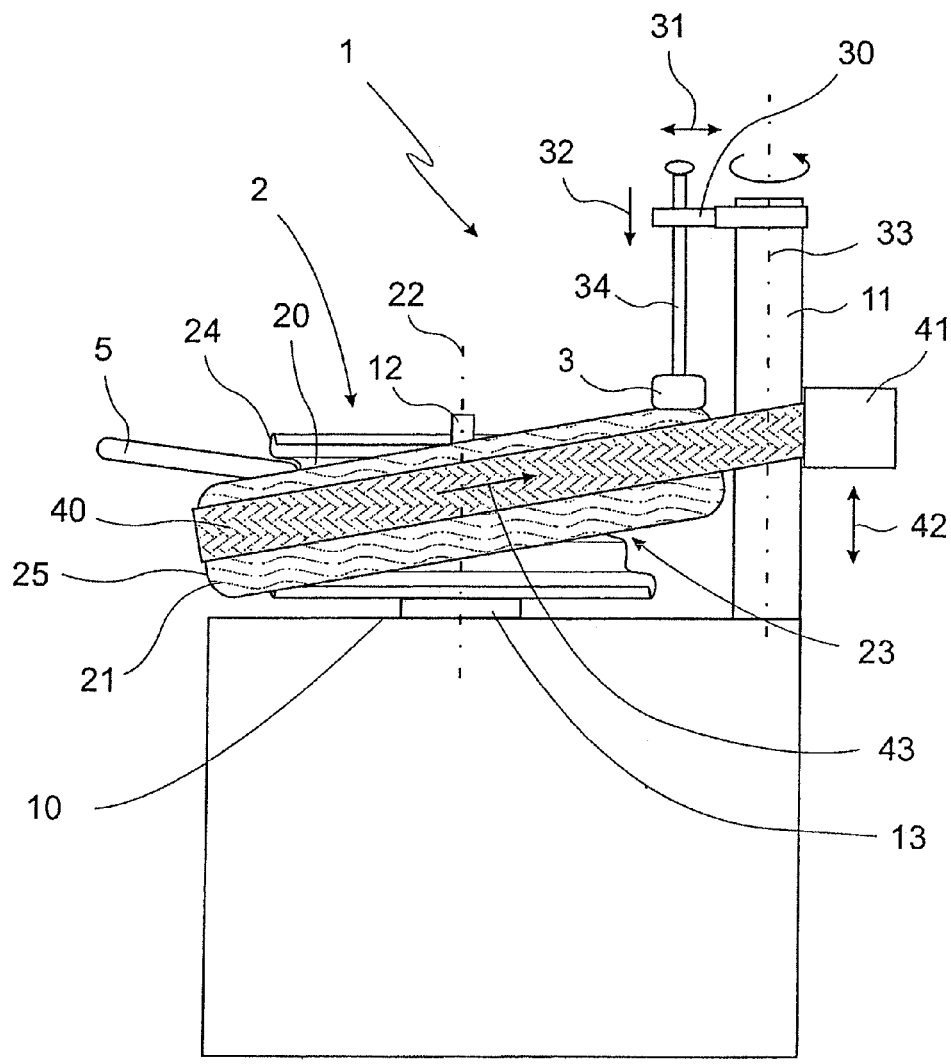
FIGS. 1a,1b,1c each in a side view the mounting system according to the invention using the mounting device according to the invention, FIG. 1d in a detail the pressing-down device for dismounting according to the invention, FIG. 2a in a top view the pressing-down device of the mounting device according to the invention, FIG. 2b a section through the pressing-down device along the line IIb-IIb in FIG. 2a and FIGS. 3, 4 in a three-dimensional view (FIG. 3) or a top view (FIG. 4) the pressing-down device according to the invention, FIGS. 5a, 5b, 5c in a top view different steps of the method according to the invention.

In FIG. 1a the mounting system according to the invention is shown schematically. A complete wheel 2 is supported on the mounting device 1 on the mounting table 10 for mounting. The complete wheel 2 consists here of a wheel rim 20 and a vehicle tire 21 which has to be mounted on it. For that purpose the mounting table 10 has a holding device 13, which comprises in particular also a holding arbor 12 by means of which the wheel rim 20 can be fastened to the mounting table 10 in a suitable way. It has to be taken into consideration that for fastening the vehicle tire 21 on the mounting table 10 there are a number of different clamping devices, which all can be used according to the invention.

According to the invention it is tantamount here whether the wheel rim 20 is supported directly on the mounting table 10, that means its surface, or, as shown here, arranged slightly spaced from it above the actual surface of the mounting table 10.

At the side of the wheel 2 a stanchion 11 is provided carrying a lug 30. The stanchion 11 here projects clearly beyond the upper edge of the wheel rim 20. The orientation of the stanchion 11 is essentially parallel to the tire axis 22, which itself is defined rectangular to the wheel rim 20 (for example defined by the upper circle-like edge of the wheel flange 24). The result from that is that the lug 30 is arranged some space apart above the vehicle tire 21 which has to be mounted.

Figure 1B:
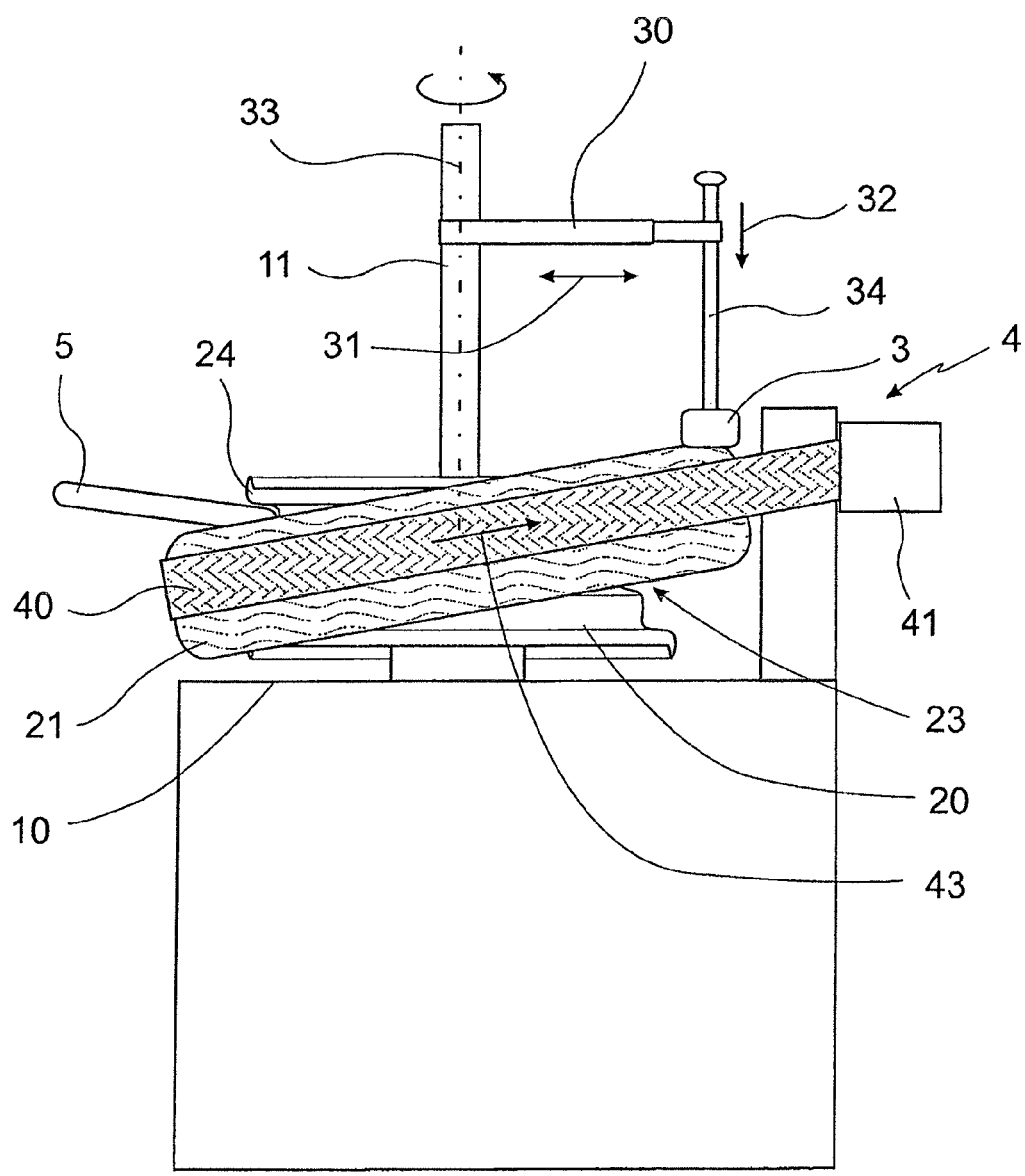

The status of mounting shown in FIG. 1a is that shortly before finishing. During the mounting process the vehicle tire 21, as it can be seen clearly for example in FIG. 1a or FIG. 1b, is slid on the wheel rim 20 tilted to the wheel rim 20 in such a way that in the left hand area the bottom and the top bead are already on the wheel rim 20, that means behind or below the upper wheel flange 24, but not yet the right hand area. The second top tire bead of the vehicle tire 21 has still to be brought over the upper wheel flange 24 in the right hand area. In order to get this done the invention proceeds as follows.

The mounting system according to the invention comprises a pushing device 4 consisting in the example described here of a belt 40 and a tensioning device 41 for the belt. The belt 40 is put on a large part of the cover 25 of the tire in the direction of circumference of the vehicle tire 21. The tensioning device 41 has the effect that the belt 40 is shifted in the direction of the arrow 43 to the right so that the vehicle tire 21 altogether wants to be shifted to the right relatively to the wheel rim 20. However, as the wheel rim 20 is held on the mounting table 10 by the clamping device in the left hand area of the wheel rim 20 the top bead glides in the drop base 23 so that the right hand area of the top bead is shifted so far to the right with respect to the radial direction (with reference to the wheel rim 20), that this bead can be pushed by means of the pressing-down device 3 in a simple and in particular for the vehicle tire gentle way over the wheel flange 24. The pressing-down device 3 is here positioned at a guiding rod 34 orientated in this embodiment vertically and is able to be pressed essentially parallel to the wheel axis 22, in this case downward, this is indicated by the arrow 32. For that purpose there is a suitable drive (not shown) provided at the pressing-down device 3 which is, for example, hydraulically, pneumatically or even electrically designed, and has the effect that the pressing-down device 3 is moved downward in the direction of the arrow 32. It is clear that for dismounting purposes another direction of movement must be provided, or the wheel rim is simply put on the mounting table upside down in order to press off the vehicle tire over the upper wheel flange 24. It is, of course, also possible to activate the pressing-down device manually, for example by means of a suitable linkage with lever pairs or the like. However, the invention makes it basically also possible to slide the vehicle tire with the hand in the direction of the arrow 32, that means in the direction parallel to the wheel axis 22 on the wheel rim.

For arranging the pressing-down device 3 the invention suggests several modifications shown in FIGS. 1a or 1b. In the embodiments shown in FIG. 1a the pressing-down device 3 is held via the rod 34 to the lug 30, the arrangement being chosen in such a way that the position of the rod 34 on the lug 30 can be set. By means of that different diameters of the vehicle tires and wheel rims can be considered. The shifting or adjustment is indicated by the double arrow 31. Furthermore optionally also swivelling of the lug 30 around the rotational axis 33 of the stanchion 11 is provided. This also makes it possible to set the joining point of the pressing-down device 3. Adjustment is done manually, if necessary, or by means of suitable electric, pneumatic or hydraulic actuating drives.

In order to make sure that the bead of the vehicle tire 21 (this is possible with the bottom as well as the top bead) is located in the drop base 23 during mounting this is supported by the pressing-down device 5 which is introduced on the left hand side between the vehicle tire 21 and the wheel flange 24 supported on that on its interior edge, and which is designed, for example as hand tool.

In order to prevent the belt 40 from a possible sliding off the cover 25 of the tire during the tensioning process a position change 42 of the tensioning device 41 is provided. This is realised in the example shown here as change of the level at the stanchion 11. By means of that it is possible to compensate the shifting of the belt 40 during tensioning in a suitable way.

In FIG. 1b a design very similar to the one shown in FIG. 1a is shown. The difference is here only the design of the stanchion 11 which can be fastened in the embodiment shown in FIG. 1b on the holding arbor 12. The lug 30 is here designed, for example, like a telescope therefore makes a change of the position of the rod 34 possible. It can be seen clearly in this example that the rotational axis 33 of the lug 30 is parallel to the wheel axis 22 defined by the wheel rim 20.

A comparison of FIGS. 1a and 1b shows that in the modification according to FIG. 1b the stanchion 11 is not located next to the complete wheel 2, but it penetrates the wheel rim 20 in its center as the stanchion 11 is put on the holding arbor 12 and is fastened there. The wheel rim 20 is slid on the holding arbor 12.

Figure 1C:
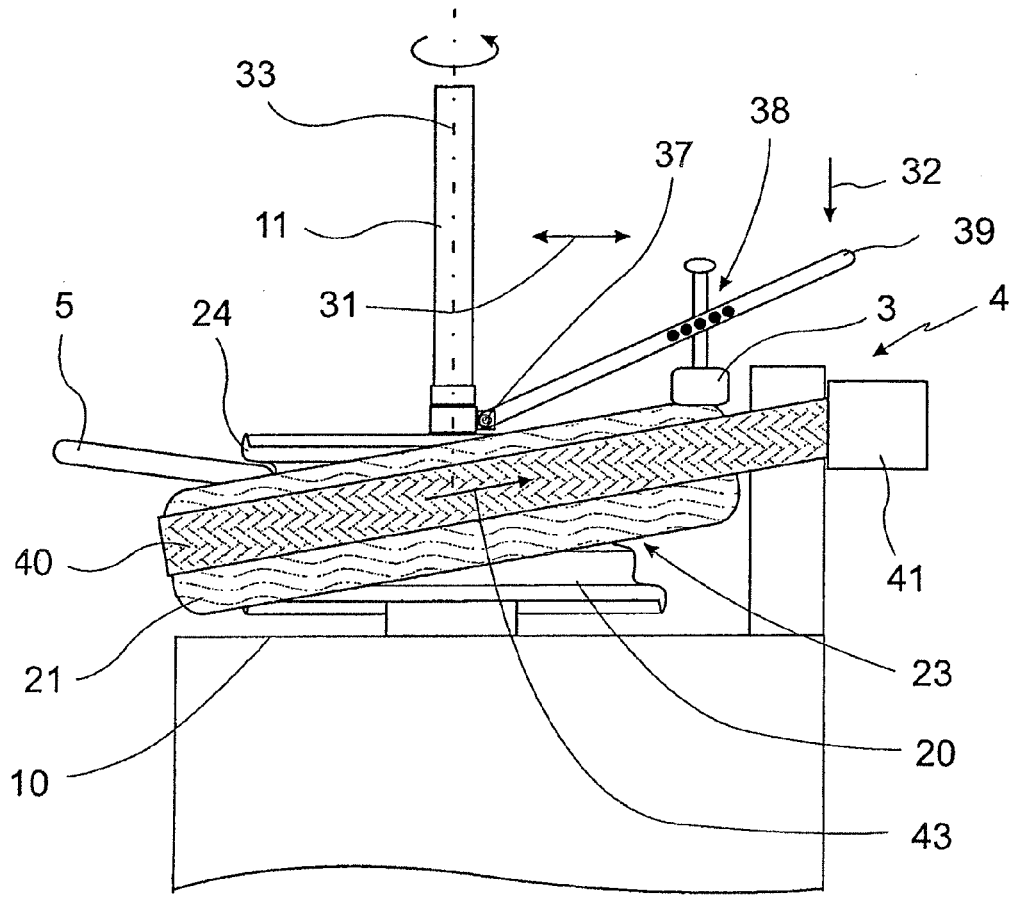

In the example shown in FIG. 1c, instead of a an electrically, hydraulically, pneumatically provided or driven pressing-down device 3 a pressing-down device equipped with a lever 39 is provided.

The lever 39 can be rotated here at the joint 37 around an essentially horizontal rotational axis (thus rotating laying parallel to the wheel rim 20).

The lever 39 has several catch positions 38 through which the radial distance of the pressing-down device 3 can be adjusted to the respective size of the tire.

By means of muscle force then the lever 39 is pressed downward at its exterior end using the lever principle (direction of arrow 32) in order to press the tire bead in this area below the wheel flange when the belt is tensioned.

Figure 1D:
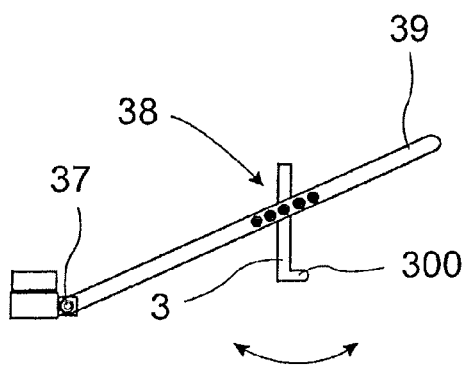

FIG. 1d shows a modification of the pressing-down device 3 for dismounting where it has a hook 300 in order to draw off the vehicle tire 21 upward. By means of the invention, however, the tire can also be pressed off downward, this exchange unit can be moved downward as well as upward in order to dismount the vehicle tire 21 gently from the wheel rim 20. The hook 300 is supported on bearings rotating.

Figure 2A:
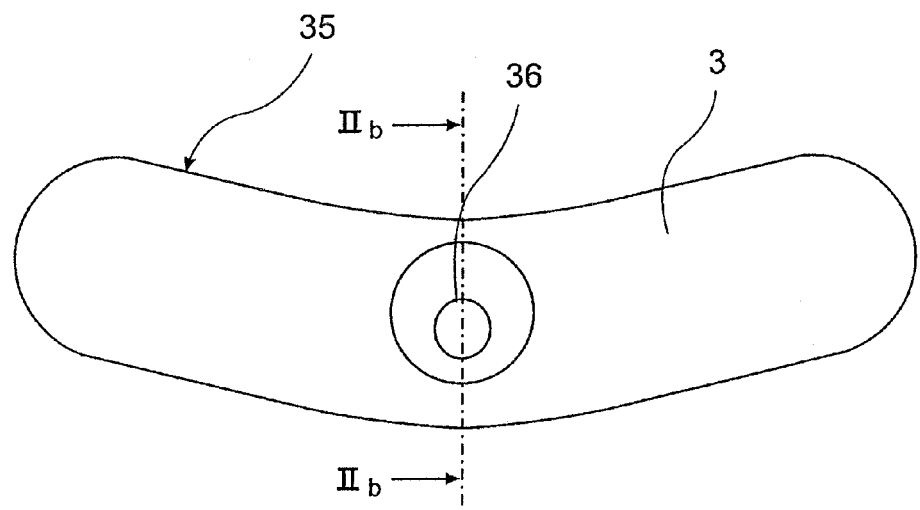

FIG. 2a shows schematically the pressing-down device 3 which is bent following the course of the tire and has in the middle, centrally a fastening opening 36 for fastening the pressing-down device 3 to the rod 34. Cleverly the interior surface 35 facing the wheel rim 20 is chamfered in order to press in a suitable way the bead over the wheel flange 24.

Figure 2B:
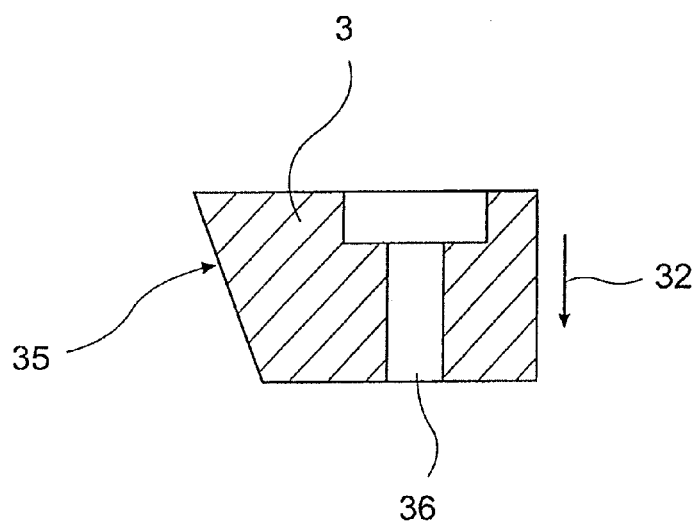

In FIG. 2b this chamfering 35 is shown schematically. Here the area of the interior surface 35 below in the direction of movement 32 during use of the pressing-down device recedes further from the wheel rim, this distance is then in the further proceedings reduced accordingly by the chamfered interior surface 35. The pressing-down device consists, for example, of solid synthetic material, if necessary with a metal reinforcement.

Figures 3, 4:
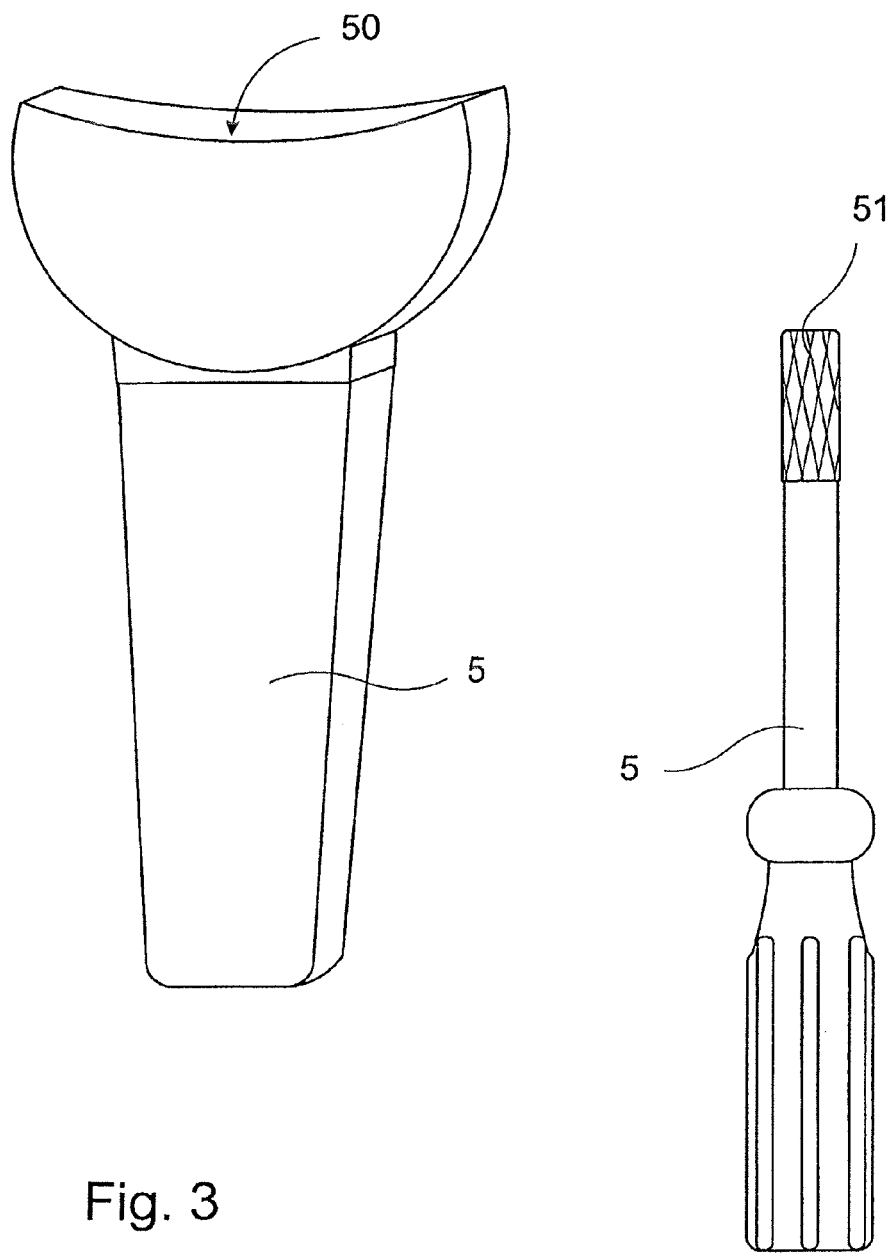

FIG. 3 and FIG. 4 show two alternative embodiments of the pressing-down device 5, in FIG. 3 the pressing-down device having an arched interior surface 50 following the course of the rim or the bead in order to be able to interact on a large area with the tire. The pressing-down device 5 consists here, for example, of synthetic material, additionally to the arching the interior surface 50 is also chamfered, that means designed wedge-like in the side view.

In FIG. 4 another modification of the pressing-down device 5 is realised. The pressing-down device 5 is here designed similar to a screw driver and has a cover 51, for example of synthetic material or rubber, in order to spare the tire bead.

Figure 5A:
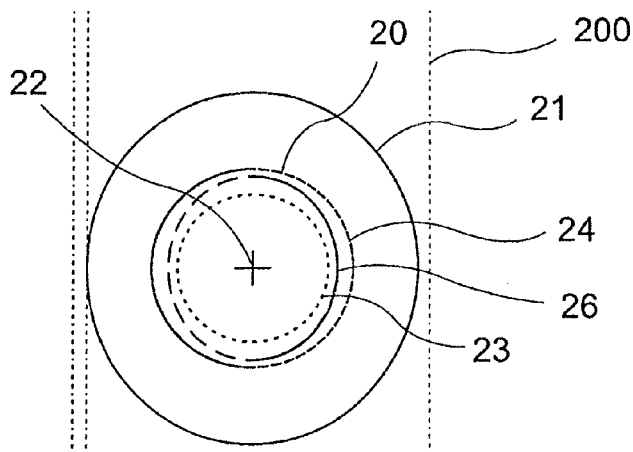
Figure 5B:
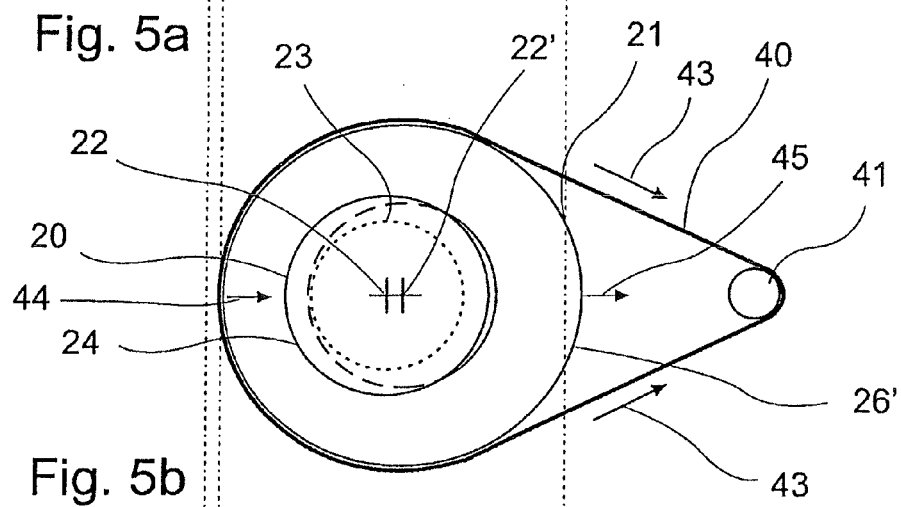
Figure 5C:
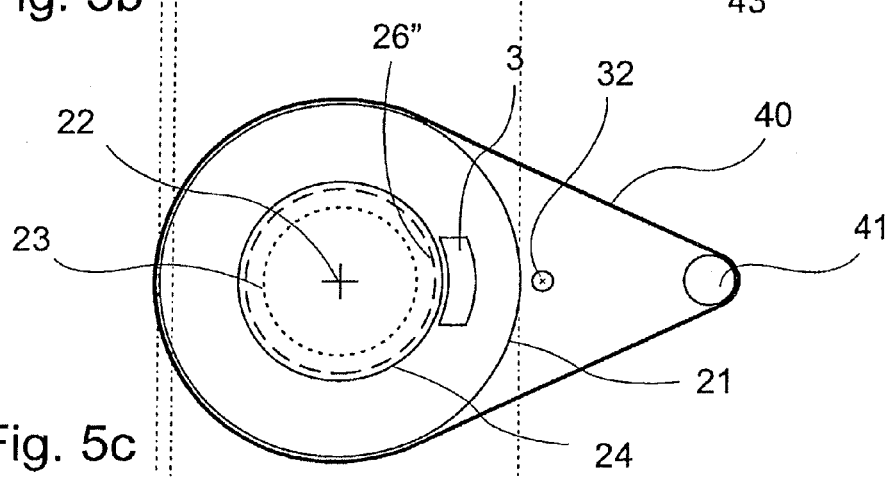

By means of the drawings according to FIGS. 5a, 5b, 5c the method according to the invention is explained in short in the following.

First of all the vehicle tire 21 is slid on the wheel rim 20. This is shown in FIG. 5a. As the tire 21 has to be put on tilted the result will be an essentially elliptic view of the vehicle tire 21. At this point it is already referred to the artificial line 200 arranged in the right hand part of the tire, and the fact that in this projection there is a gap between the artificial line 200 and the right hand edge of the tire 21. Edges which are positioned covered are, as far as they are important, indicated by dashed lines. Important here is the interior tire bead 26 which slides in the left hand area below the wheel flange 24 and is in the right hand area still above. It can be seen clearly that in the right hand area the tire bead 26 is within the diameter of the wheel flange 24, which is somewhat covered by it.

In the next step (5b) the pushing device 4 is in use. For that the belt 40 is put on the cover 25 of the tire in another area following it in the direction of the circumference. The tensioning device 41 is active, the belt 40 is drawn in the direction of the arrow 43 in the last consequence to the right and a power component is impressed on the vehicle tire 21 also to the right. This leads then to a rather high radial power component 44 to the right in the left hand area of the tire, so that the tire 26 located in this area below the wheel flange 24 is pressed into the drop base 23. By a drawing movement 43 the imagined wheel axis 22' is shifted to the right.

Also the right hand area of the tire is shifted to the right along the arrow 45 in such a way that here the tire bead 26' gets to the right (idealised) outside the diameter of the wheel flange 24. With reference to the artificial line 200 the right part of the tire is, by the way, shifted so far to the right that the artificial line 200 cuts the tire. This is the essential effect of the invention, namely that by the pushing device 4 in the area of the tire which is already below the wheel flange, the bead is pressed in the drop base, and the area opposite this area (in FIG. 5b, possibly shown very exaggerated, however, correspondingly correct) gets thus over or beyond the wheel flange in order to be pushed then in a movement rectangular to the drawing plane downward (see direction of the arrow 32 in FIG. 5c). Seen in drawing or tensioning direction (43) next to the wheel axis 22 the pressing-down device 3 is provided which now presses in a movement rectangular to the tensioning direction 43 the area of the tire bead 26", in the ideal case over the wheel flange, otherwise only slightly jamming downward so that the tire bead gets with its entire circumference in the drop base. Now mounting is finished.

The claims filed with the application now and to be filed later on are attempted formulations without prejudice for obtaining a broader protection.

If here, on closer examination, in particular also of the relevant prior art, it turns out that one or the other feature may be convenient for the object of the invention, however, not decisively important, of course, already now a formulation is striven for which does not contain anymore such a feature, in particular in the main claim.

Furthermore it has to be taken into consideration that the embodiments and modifications of the invention described in the different examples and shown in the figures can be combined with each other in any way. Here single or several characteristics can be exchanged at will. These combinations of characteristics are also disclosed.

References in the sub-claims relate to the further design of the matter of the main claim through the characteristics of the respective sub-claim. These are, however, not to be understood as a waiver of independent protection of the matter for the characteristics of the referred sub-claims.

Characteristics only disclosed in the description so far may now, in the course of proceedings, be claimed as being of inventive relevance, for example to distinguish from the state of the art.

Characteristics only disclosed in the description or even single characteristics of claims comprising a number of characteristics may be taken over in the main claim at any time to distinguish from the state of the art, and this is even if such characteristics have been mentioned in connection with other characteristics, and achieve particularly convenient results in connection with other characteristics, respectively.

The invention claimed is:

1. A method for dismounting a vehicle tire from a wheel rim comprising in sequence the following steps:
   clamping the wheel on a mounting table;
   arranging a belt on the tire and tensioning the belt via a sliding tensioning device;
   pressing a top bead at least partly in a drop base;
   pushing the tire upward on the wheel rim by a hooked tool;
   moving the top bead over the upper wheel flange;
   re-clamping the belt;
   pushing the bottom bead at least partly into the drop base;
   pushing the tire upward at the wheel rim by the hooked tool; and
   moving the bottom bead over the upper wheel flange;
   wherein a position change of the tensioning device is provided to prevent the belt from sliding off a cover of the tire during the tensioning process.

2. The method of claim 1, wherein by tensioning of the belt the top bead is pushed in the drop base in an area of about ⅓ of its circumference.

3. The method of claim 1, wherein by tensioning of the belt a gap occurs opposite of the point of pressure, which is caused by the belt, between the top bead and the wheel flange.

4. The method of claim 1, wherein a lower belted edge is fixed and slightly pre-tensioned.

* * * * *